(12) United States Patent
Honmo et al.

(10) Patent No.: US 12,226,853 B2
(45) Date of Patent: Feb. 18, 2025

(54) SURFACE PROCESSING METHOD AND STRUCTURE

(71) Applicant: TOYOKOH Co., Ltd., Shizuoka (JP)

(72) Inventors: Yoichi Honmo, Miyagi (JP); Yasunori Kato, Miyagi (JP); Tsuyoshi Saito, Miyagi (JP); Masafumi Hosokawa, Miyagi (JP); Kenjiro Momi, Shizuoka (JP); Manabu Haraguchi, Shizuoka (JP); Yuji Furumaki, Shizuoka (JP); Hiroshi Senda, Shizuoka (JP)

(73) Assignee: TOYOKOH Co., Ltd., Shizuoka (JP)

( * ) Notice: Subject to any disclaimer, the term of this patent is extended or adjusted under 35 U.S.C. 154(b) by 0 days.

(21) Appl. No.: 18/220,058

(22) Filed: Jul. 10, 2023

(65) Prior Publication Data

US 2023/0347448 A1   Nov. 2, 2023

Related U.S. Application Data

(63) Continuation of application No. PCT/JP2022/001077, filed on Jan. 14, 2022.

(30) Foreign Application Priority Data

Jan. 16, 2021   (JP) ................. 2021-005400

(51) Int. Cl.
*B32B 15/01* (2006.01)
*B08B 3/04* (2006.01)
(Continued)

(52) U.S. Cl.
CPC .............. *B23K 26/362* (2013.01); *B08B 3/04* (2013.01); *B32B 15/013* (2013.01); *B23K 26/142* (2015.10); *B23K 2101/34* (2018.08)

(58) Field of Classification Search
None
See application file for complete search history.

(56) References Cited

U.S. PATENT DOCUMENTS 5,281,798 A * 1/1994 Hamm .............. B23K 26/40
250/226
9,868,179 B2   1/2018 Toyosawa et al.
(Continued)

FOREIGN PATENT DOCUMENTS

JP   H5-177369 A   7/1993
JP   H7-506297 A   7/1995
(Continued)

OTHER PUBLICATIONS

International Search Report issued in PCT/JP2022/001077 mailed on Apr. 5, 2022 with English Translation (5 pages).
(Continued)

*Primary Examiner* — Daniel J. Schleis
(74) *Attorney, Agent, or Firm* — Nakanishi IP Associates, LLC

(57) ABSTRACT

Provided is a surface treatment method of a metallic material having a protective layer formed thereon. A surface of the protective layer is scanned while irradiating the surface and the surface is scanned while moving an irradiation spot along the surface, in a state in which a side layer of the protective layer along the metallic material remains covering the metallic material, and a side layer of the protective layer opposite to the metallic material side is removed by irradiation with the laser beam.

7 Claims, 5 Drawing Sheets

(51) Int. Cl.
  *B23K 26/362* (2014.01)
  *B23K 26/142* (2014.01)
  *B23K 101/34* (2006.01)

(56) References Cited

U.S. PATENT DOCUMENTS 11,135,681 B2 10/2021 Toyosawa et al.
2021/0394308 A1 12/2021 Toyosawa et al.

FOREIGN PATENT DOCUMENTS

| | | | |
|---|---|---|---|
| JP | 2004-148163 A | | 5/2004 |
| JP | 5574354 B2 | | 8/2014 |
| JP | 2017124391 A | * | 7/2017 |
| JP | 2020186556 A | * | 11/2020 |
| WO | 1993/012905 A1 | | 7/1993 |

OTHER PUBLICATIONS

Written Opinion of International Searching Authority issued in PCT/JP2022/001077 mailed on Apr. 5, 2022 with English Translation (7 pages).

* cited by examiner

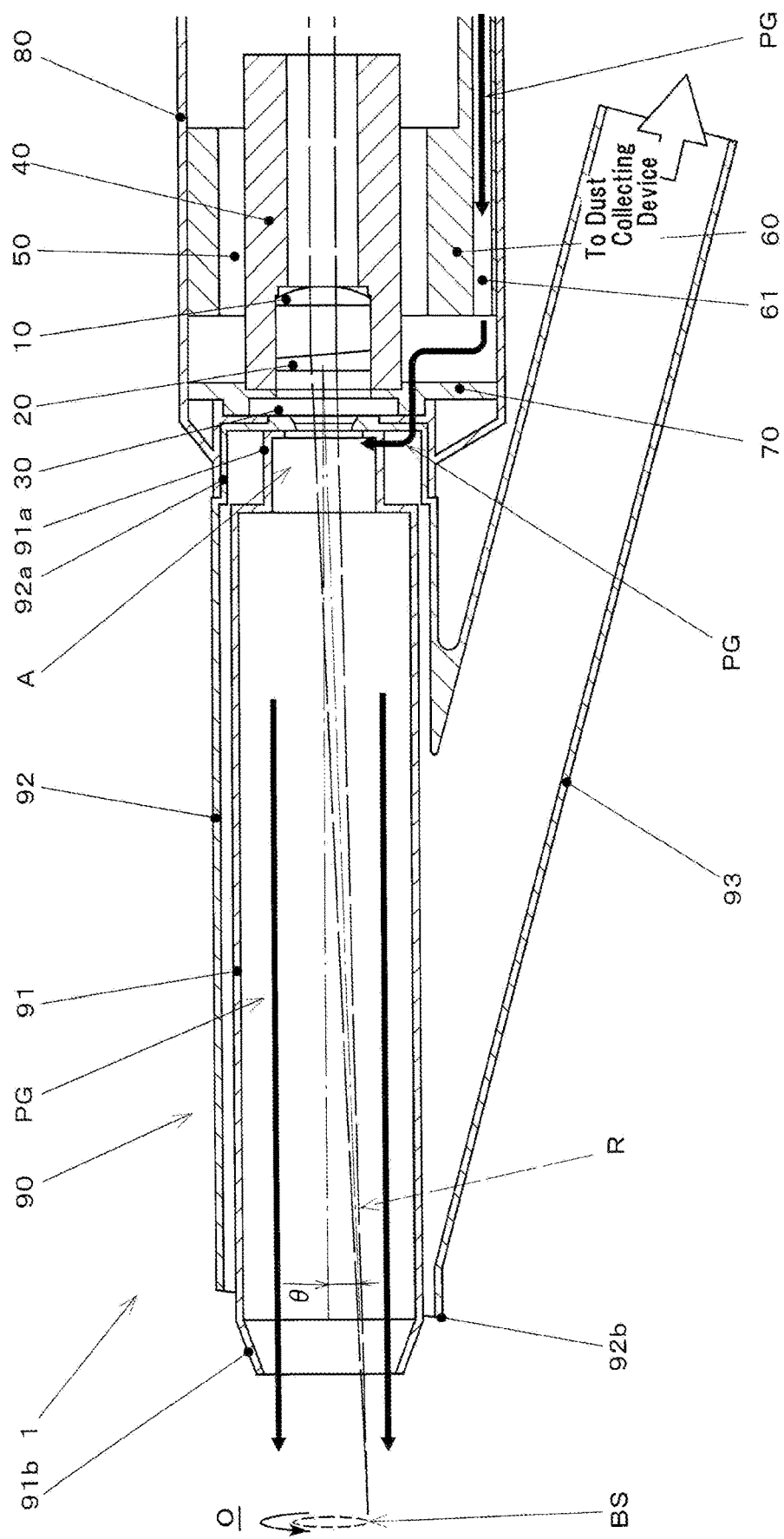
[FIG. 1]

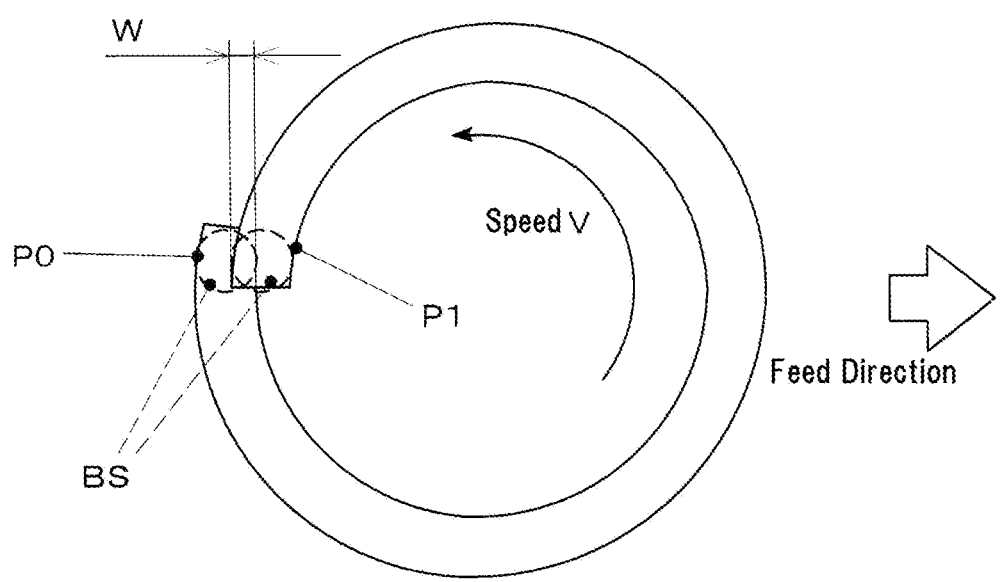
[FIG. 2]

[FIG. 3]
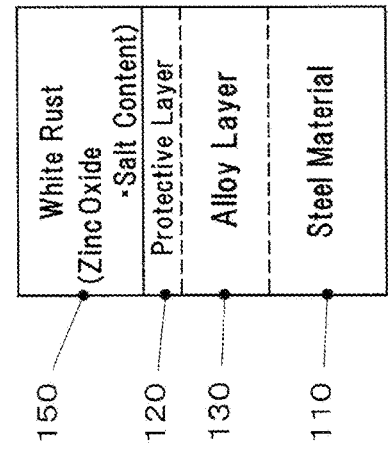
(a)
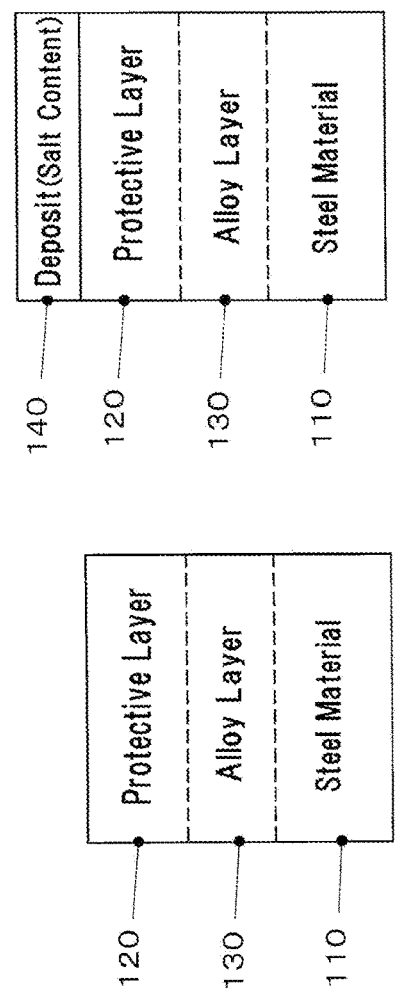
(b)
(c)
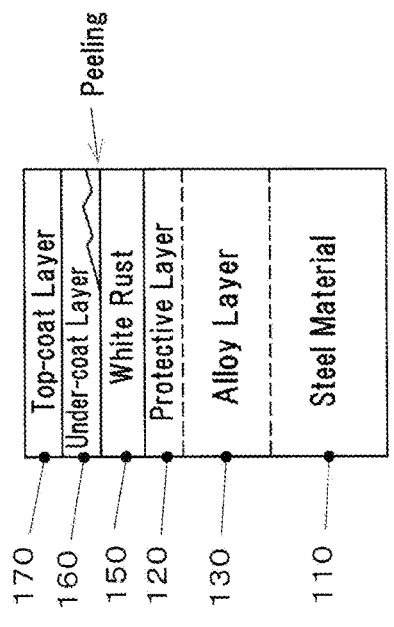
(d)
(e)
(f)

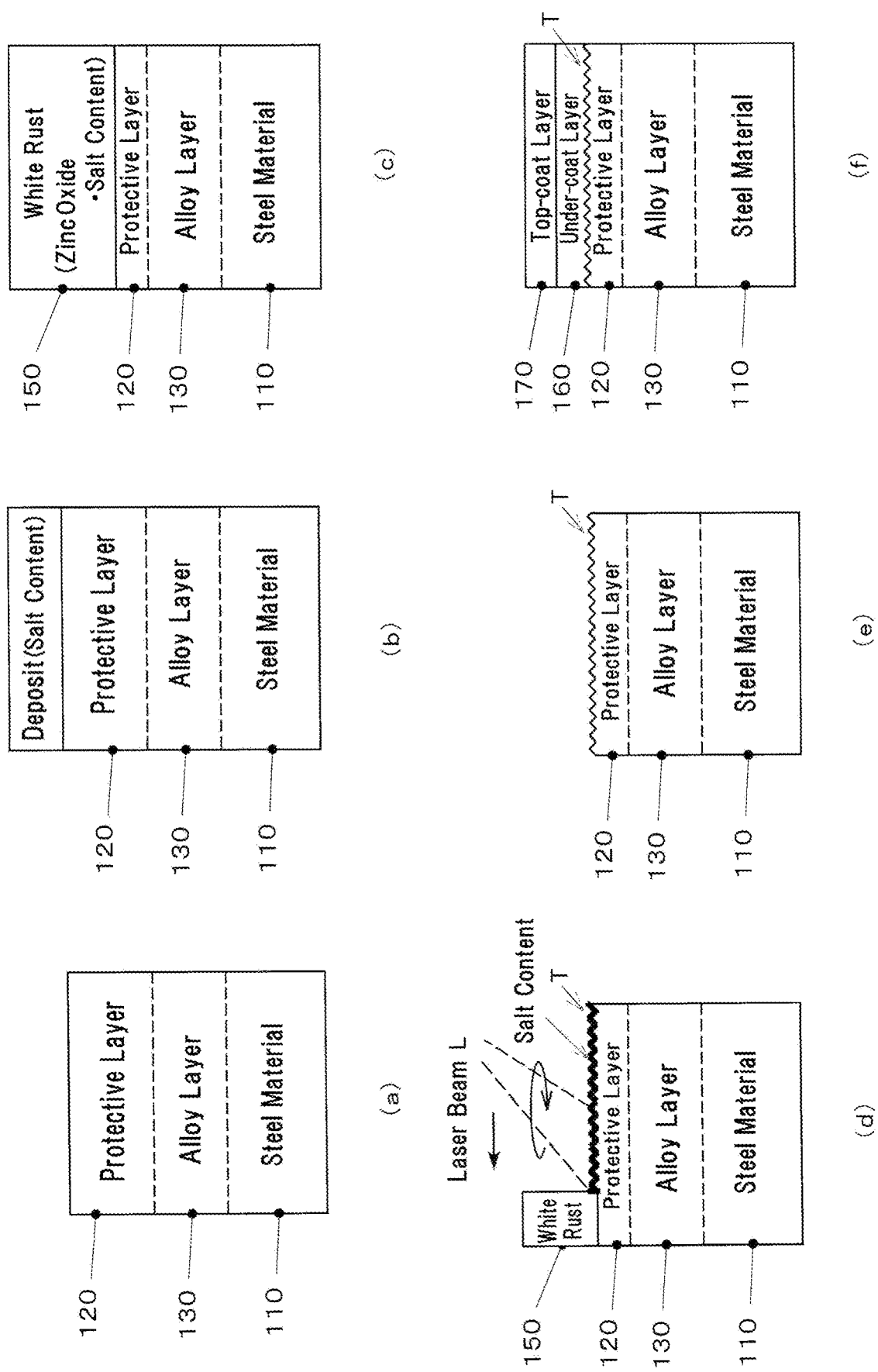

[FIG.5]
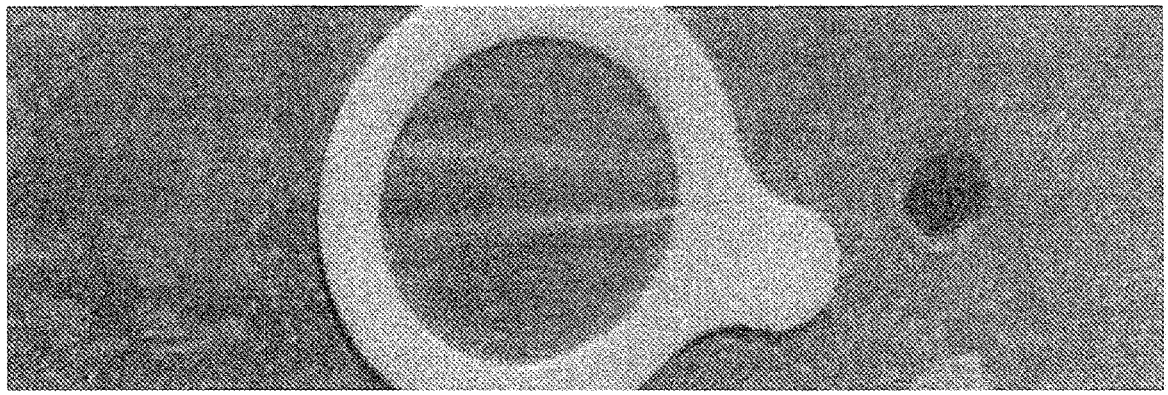
(a) Comparative Example (Scraping by Cup Wire)
(b) Example 1 (Laser 2 passes)
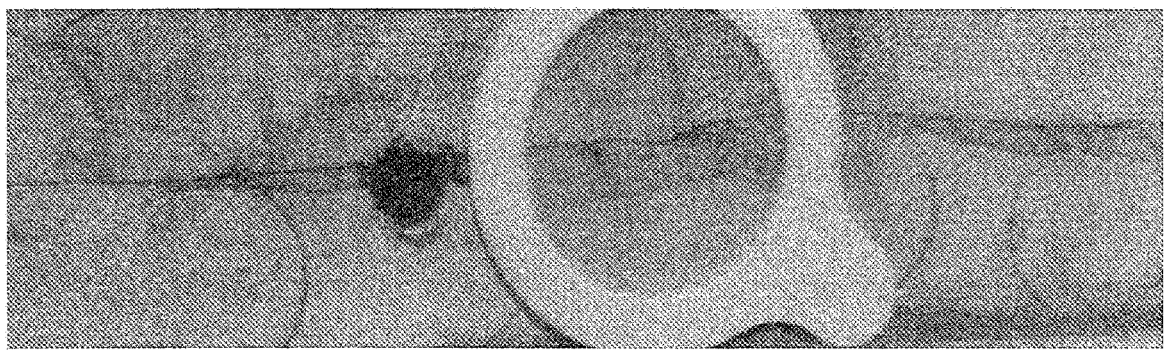
(c) Example 2 (Laser 1 pass + Water Washing)

SURFACE PROCESSING METHOD AND STRUCTURE

CROSS-REFERENCE TO RELATED APPLICATIONS

This application is a continuation application of International Patent Application No. PCT/JP2022/001077 filed on Jan. 14, 2022, which claims priority to Japanese Patent Application No. 2021-005400 filed on Jan. 16, 2021, the entire contents of which are incorporated by reference.

TECHNICAL FIELD

The present invention relates to a method for surface processing of a metallic material having a protective layer formed thereon, and to a structure comprising a metallic material with a protective layer formed thereon.

BACKGROUND TECHNOLOGY

For example, in a structure such as a steel tower constructed as a ground facility of a wireless communication network such as a mobile phone, in order to prevent deterioration such as rust and corrosion, an iron-based material such as steel having a protective layer formed on a surface portion by hot clip galvanizing, for example, is used.

Hot clip galvanizing is a technique in which a steel member is clipped in a molten zinc bath at an elevated temperature to form a zinc coating on the surface of the member.

The protective layer mainly composed of zinc and formed by hot-clip galvanizing exhibits a protective coating effect that prevents air and water from contacting the steel and suppresses the occurrence of rust. And, even when the zinc coating is scratched and the base material is exposed, the protective layer also exhibits a sacrificial anticorrosive effect that the surrounding zinc dissolves out prior to the base material and electrochemically protect it, thus suppressing corrosion of iron.

In a steel structure on which a protective layer is formed by hot-dip galvanizing, when, for example, salt content or the like adheres to the surface of the protective layer, a deteriorated portion such as so-called white rust containing zinc oxide as a main component may be formed.

Further, in situations where the protective layer is damaged by such as corrosion or scratches, corrosion of the steel as a base material may lead to so-called red rust.

In the prior art relating to maintenance of steel structures on which a protective layer is formed by hot dip galvanizing, the patent document 1 for example, describes the following process, in which the deteriorated coating film is removed by using a power tool such as a disc sander or a hand tool such as a scraper, a hammer or the like, and by scraping the surface of the steel material and cleaning the surface, and after that, a rustproof under coating is formed on a substrate using a under coating processing liquid containing phosphoric acid, a silicon compound, and an alcoholic solvent, and after drying, a rust conversion type rust preventive coating or the like is coated.

As a prior art related to the surface scraping process of steel structures or the like, document 2, for example, describes that an irradiation head for irradiating a laser beam onto an processing object is provided with a wedge prism for deflecting a laser beam by a predetermined angle, and the laser beam is irradiated while rotating the wedge prism, thereby rotationally scanning the surface of the processing object, and removing (cleaning) old paint films and foreign matters or the like adhered to the surface of the processing object.

PRIOR ART DOCUMENT

Patent Document

Patent Document 1: JP 2004-148163
Patent Document 2: U.S. Pat. No. 5,574,354

SUMMARY OF THE INVENTION

Problem to be Solved by the Invention

It is an object of the present invention to provide a surface processing method and a structure in which the base material protection performance is enhanced by a remaining protective layer after the removal processing of deteriorated portions.

Means for Solving the Problem

The present invention solves the above-described problems by the following solutions.

According to a 1st aspect of the present invention, there is provided a surface processing method of a metallic material having a protective layer formed thereon, wherein the surface of the protective layer is irradiated with laser beam and the surface is scanned while moving an irradiation spot along the surface, in a state in which a side layer of the protective layer along the metallic material remains, and a side layer of the protective layer opposite to the metallic material side is removed by irradiation with the laser beam.

This allows the protective layer to remain partially on the metallic material side by partially removing the protective layer by irradiation with laser beam, leaving a portion of the protective layer in a bonded state on the metallic material side similar to that before processing. Therefore, even after the removal processing of the deteriorated portion is performed, the base material protection performance can be enhanced by the remaining protective layer.

It should be noted that in the present invention, the side layer on the metallic material side of the protective layer preferably remains substantially over the entire surface of the region where the protective layer was formed prior to irradiation, but, for example, even when the protective layer is removed by irradiation with laser beam and an area where the metallic material is exposed is partially formed, the base material protection performance can be increased in other areas.

The irradiation processing of the laser beam capable of leaving a part of such a protective layer on the metallic material side can be achieved by appropriately setting an energy density and an irradiation time given to the processing object by the laser beam depending on the amount of adhesion of the deteriorated part such as white rust and the film thickness of the protective layer.

In addition, the irradiation of the laser beam can be performed relatively remotely compared to a mechanical scraping process in which a tool is directly accessible to the processing object as a precondition. Thus, a removal process of a deteriorated portion at a narrow portion, such as a periphery of a recess or a bolt nut, can be easily and reliably performed.

Further, since periodic irregularities are formed on the surface by irradiation traces (marks) by irradiation with laser beam, and surface roughness becomes rough, bond strength of the coating film can be ensured when re-painting is performed on the surface after the removal process.

It should be noted that the metallic material to be treated in the present invention is not limited to the material on which the protective layer is formed over the entire surface, but includes, for example, the material on which some areas of the protective layer is lost due to corrosion, wear, etc. or the protective layer has not been originally formed in some areas. Even in this case, it is possible to practice the present invention in the area where the protective layer is formed, and the effect of the present invention can be also obtainable for this area.

According to a 2nd aspect of the present invention, there is provided a surface processing method according to the first aspect, wherein the scanning is performed in a state in which the irradiation spot periodically moves along a predetermined pattern on the surface.

For example, the method may be arranged so that the irradiation spot scans while swirling in an arc shape along the surface of the processing object.

According to this method, by controlling the size of the pattern (for example, the turning circle diameter in the arcuate turning irradiation) or the moving period of the irradiation place (beam spot) (for example, the rotation speed in the turning irradiation), and, when focusing attention on one point of the surface of the processing object, by appropriately controlling the irradiation time and the irradiation period, the application quality can be ensured.

Further, by scanning along a predetermined pattern, the processing area per unit time can be enlarged and the processing speed can be accelerated.

According to a 3rd aspect of the present invention, there is provided a method, wherein said metallic material is an iron-based metal and said protective layer is a coating including zinc as a main component.

According to this method, the deteriorated portion can be removed while maintaining the sacrificial corrosion protection effect between the zinc including protective layer and the iron-based metal as the base material, and the above-described effect can be obtained.

Such coatings can be formed, for example, by hot clip galvanizing. When hot clip galvanizing is adopted, since an alloy layer having a concentration gradient of each iron and zinc is formed between the layer composed mainly of ferrous metal and the layer composed mainly of zinc, the bond strength of the protective layer to the metallic material is high. In the present invention, even when a part of the protective layer is removed by laser beam irradiation, the alloy layer remains so that the corrosion-proof effect can be maintained even after the surface processing.

According to a 4th aspect of the present invention, there is provided a surface processing method according to any one of the aspects 1 to 3, wherein the surface is washed with a liquid containing water as a main component after the surface is irradiated with the laser beam.

This can reduce the salt content remaining on the surface even when the heat input by the laser irradiation is relatively small.

Therefore, while suppressing energy such as electric-power required for laser irradiation and processing time, good processing quality of little residual salt can be obtained.

Such liquids may include, for example, pure water, tap water, groundwater, river water, etc., as well as, for example, a liquid added a salt damage corrosion inhibitor containing a surfactant.

According to a 5th aspect of the present invention, there is provided a surface processing method according to any one of aspects 1 to 4, characterized in that the amount of salt content adhered to the surface after the irradiation or cleaning is 50 mg/m2 or less.

According to this method, durability such as corrosion resistance after the processing can be ensured.

According to a 6th aspect of the present invention, there is provided a structure in which a protective layer is formed on a surface of a metallic material, and is characterized in that a laser irradiated part on the surface of the protective layer has an irradiation mark formed by scanning the surface.

According to a 7th aspect of the present invention, there is provided a structure wherein the irradiation mark is formed along a trace of the periodic movement of a laser irradiated spot on the surface.

According to a 8th aspect of the present invention, there is provided a structure, wherein said metallic material is an iron-based metal and said protective layer is a coating including zinc as a main component.

According to a 9th aspect of the present invention, there is provided a structure according to any one of aspects 6 to 8, characterized in that the amount of salt content attached to the surface is 50 mg/m2 or less.

In each of these structures, the same effect as the effect of the invention as in the above-described surface processing method can be obtained.

Effect of the Invention

As explained above, according to the present invention, it is possible to provide a surface processing method and a structure in which the base material protection performance is enhanced by the remaining protective layer after the deterioration section has been removed.

BRIEF DESCRIPTION OF THE DRAWINGS

FIG. 1 is a cross-sectional view of an irradiation head used in a first embodiment of a surface processing method to which the present invention is applied.

FIG. 2 is a diagram illustrating an example of a trajectory of a beam spot in an embodiment.

FIG. 3 is a schematic cross-section al view showing in time series a surface of a processing object before and after a surface processing method with a power tool according to a prior art.

FIG. 4 is a schematic cross-sectional view showing in time series a surface of a processing object before and after the surface processing method of the embodiment.

FIG. 5 is a photograph of the appearance after surface processing in Example 1 and Example 2 of the present invention, and Comparative Examples.

MODE FOR CARRYING OUT THE INVENTION

Embodiments of surface processing methods and structures to which the present invention has been applied will now be described The surface processing method according to an embodiment includes, for example, a steel tower (as an example, provided as a ground facility in a wireless communication network such as a mobile phone network) in which a protective layer is formed by hot-dip galvanizing on a base material made of an iron-based metal, such as steel, to remove a deteriorated part such as a so-called white rust such as zinc oxide, salt contents or the like derived from seawater or the like.

The structure of the embodiment may also be, for example, such a steel tower.

In the surface processing method of the embodiment, in a mode that the base-material-side layer of the protective layer remains, a deteriorated layer such as a zinc oxide (so-called white rust) formed on the surface of the protective layer is removed with a part of a surface layer of the protective layer by irradiating a laser beam, and thereafter the salt content is reduced by washing processing.

Hereinafter, the portion to be subjected to the surface processing (treatment) in the structure will be referred to as a processing object O.

The irradiation process of the laser beam is carried out by turning (rotating) the irradiation spot (beam spot BS) on the surface of the processing object O along a circular arc of a relatively large diameter of, for example, about 10 mm in diameter or larger, and removing a deteriorated layer such as a zinc oxide (white rust), adhered substances such as salt content or dirt, a part of the surface layer of the protective layer constituting the surface part of the processing object O.

In addition, when the processing object O is painted, the old paint (coating) film is also a deposit to be peeled off and removed.

FIG. 1 is a cross-sectional view of the irradiation head of the laser irradiation apparatus of the first embodiment.

The irradiation head 1 irradiates a processing object O with a laser beam L of a continuous wave (CW) transmitted from a laser oscillator (not shown) via a fiber (not shown).

The irradiation head 1 is, for example, a handy type that allows an operator to carry out a work to trace a predetermined irradiation path, but may also be used by being attached to a robot capable of moving the irradiation head 1 along a predetermined path.

In addition, in a state where the irradiation head 1 is fixed, the processing object O may be displaced relative to the irradiation head.

The irradiation head 1 includes a focus lens 10, a wedge prism 20, a protective glass 30, a rotary cylinder 40, a motor 50, a motor holder 60, a protective glass holder 70, a housing 80, a duct 90 etc.

The focus lens 10 is an optical element in which the laser beam L transmitted from the laser oscillator to the irradiation head 1 via the fiber enters after passing through a collimating lens (not shown)

The collimating lens is an optical element that converts (collimates) the laser beam emitted from the end of the fiber into a substantially parallel beam.

The focus lens 10 is an optical element for focusing (condensing) the laser beam L emitted by the collimating lens at a predetermined focal position.

As the focus lens 10, for example, a convex lens having a positive power can be used.

It should be noted that the beam spot BS, which is an irradiation spot on the surface of the object O to be processed by the laser beam L, is arranged on a coincident point of the focal point or in a proximity state within the depth of focus (focusing state), or a state separated from the focal position (defocus state).

The depth of focus means a range in an optical axis direction in which the beam diameter is less than or equal to a diameter of a predetermined allowable (permissible) circle of confusion.

The wedge prism 20 is an optical element which deflects the laser beam L emitted by the focus lens 10 by a predetermined angle θ (see FIG. 1) and makes the optical axis angles of the incident side and the exit side different.

The wedge prism 20 is formed in a plate shape in which the thickness thereof is continuously changed so that one of the thicknesses in the direction perpendicular to the optical axis direction of the incident side becomes larger than the thickness of the other.

The protective glass 30 is an optical element made of a flat plate-shaped glass or the like which is disposed close to the wedge prism 20 in the focus position side (the processing object O side and the beam spot BS side) along the optical axis direction.

The protective glass 30 is a protective member which prevents foreign matter, such as a peeled material, dust, or the like, scattered from the processing object O side, from adhering to other optical elements such as the wedge prism 20.

The protective glass 30 is an optical element disposed closest to the focal position along the optical axis direction among the optical systems of the irradiation head 1, and is exposed to the processing object O side via a space portion A and an interior of the duct 90, which will be described later.

The focus lens 10, the wedge prism 20, and the protective glass 30 are formed by coating a surface of a member made of a transparent material such as an optical glass, for example, with a surface coating for preventing reflection and surface protection.

The rotating cylinder 40 is a cylindrical member that holds the focus lens 10 and the wedge prism 20 on the inner diameter side.

The rotary cylinder 40 is formed concentrically with the optical axis of the focus lens 10 and the optical axis of the laser beam L which enters to the focus lens 10 (optical axis of the collimating lens).

The rotary cylinder 40 is rotatably supported by a bearing (not shown), with respect to the housing 80, around a rotation center axis coinciding with an optical axis of the focus lens 10.

The rotary cylinder 40 is formed of, for example, a metal such as an aluminum-based alloy, an engineering plastic or the like.

The motor 50 is an electric actuator which rotationally drives the rotary cylinder 40 around a rotation center axis with respect to the housing 80.

The motor 50 is configured, for example, as an annular motor that is concentric with the rotary cylinder 40 and is provided on an outer diameter side of the rotary cylinder 40.

The stator (not shown) of the motor 50 is fixed to the housing 80 via the motor holder 60 described below.

A rotor (not shown) of the motor 50 is fixed to the rotary cylinder 40.

The motor 50 is controlled by a motor drive unit (not shown) so that the rotational speed of the rotary cylinder 40 substantially coincides with a desired target rotational speed.

To maintain a posture of an irradiation head 1 so that a rotation center axis of a rotary cylinder 40 is orthogonal to a surface near an irradiation part of a processing object O, and the motor 50 rotates a wedge prism 20 together with a rotary cylinder 40. Thus, the beam spot BS is circularly scanned along the surface of the processing object O in an arc shape around the rotation center axis of the rotary cylinder 40.

When the irradiation head 1 is moved translationally along the surface of the processing object O in this state, the beam spot BS scans the surface of the object O while rotating In an arc shape.

Thus, when attention is paid to an arbitrary point on the processing object O, the laser beam L is incident in a pulse form only for a short time, and rapid heating and rapid cooling sequentially occur in a short time.

At this time, the surface of the processing object O is crushed and scattered.

The motor holder 60 is a support member that holds the stator of the motor 50 in a predetermined position inside the housing 80.

The main body portion of the motor holder 60 is formed in a cylindrical shape and is fixed to the housing 80 in a state of being inserted into the inner diameter side of the housing 80.

The inner peripheral surface of the motor holder 60 is disposed facing the outer peripheral surface of the motor 50 and is fixed to the stator of the motor 50.

A purge gas flow path 61 through which a purge gas PG flows is formed in a portion between an outer peripheral surface and an inner peripheral surface of the motor holder 60.

The purge gas PG is a gas ejected to the processing object O side from a space part A which comes into contact with the surface part on the processing object O side of the protective glass 30 located inside the inner cylinder 91 of the duct 90 (to be described later), when the irradiation head 1 is used (at the time of irradiation). A surface portion of the protective glass 30 on the processing object O side is disposed so as to be exposed inside the space portion A.

The purge gas PG has a function of preventing debris such as dust and foreign matter scattered from the processing object O side from flying into the housing 80 and adhering to the protective glass 30.

The purge gas flow path 61 is an opening formed through a portion of the motor holder 60 in an axial direction of the motor 50.

The purge gas PG discharged from the purge gas flow path 61 is introduced into the inner diameter side of the inner cylinder 91 of the duct 90 via a flow path provided in the housing 80.

The protective glass holder 70 is a member fixed to the inner diameter side of the housing 80 while holding the protective glass 30

For example, the protective glass holder 70 is formed in a disk shape in which a circular opening is formed in the center.

The laser beam L passes through an aperture from the wedge prism 20 side toward the processing object O side.

On a surface portion of the protective glass holder 70 on the processing object O side, a recessed portion is formed into which a protective glass 30 is fitted.

The protective glass 30 is held inside the housing 80 in a state in which it is fitted into this recess.

The protective glass 30 is detachably attached to the protective glass holder 70 so as to be replaceable when contamination or burnout occurs.

A surface portion of the protective glass holder 70 on the side opposite to the processing object O side is opposed to an end surface of the motor holder 60 on the processing object O side with a space.

This space constitutes a part of a flow path (a part of the fluid supply unit) which introduces the purge gas PG introduced from the purge gas flow path 61 of the motor holder 60 into the space portion A on the processing object O side of the protective glass 30.

The housing 80 is a cylindrical member constituting a casing of the main body portion of the irradiation head 1.

In the inside of the housing 80, the focus lens 10, the wedge prism 20, the protective glass 30, the rotary cylinder 40, the motor 50, the motor holder 60, the protective glass holder 70, etc. which were mentioned above are stored, also, an end on the irradiation head 1 side of the fiber and the collimate lens, which is not illustrated, are stored.

The duct 90 is a double cylindrical member which is provided so as to protrude from an end of the housing 80 on the processing object O side.

The duct 90 includes an inner cylinder 91, an outer cylinder 92, a dust collecting device connecting cylinder 93 etc.

The motor holder 60, the protective glass holder 70, and the housing 80 described above are formed of, for example, a metal such as an aluminum alloy, an engineering plastic or the like.

The inner cylinder 91 is formed in a cylindrical shape.

The laser beam L passes through the inner diameter side of the inner cylinder 91 and is emitted to the processing object O side.

At the end of the inner cylinder 91 on the housing 80 side, a small diameter portion 91*a* is formed in a stepped shape in smaller size than the other portion.

A purge gas PG is introduced into the internal space A of the small diameter portion 91*a* from the inside of the housing 80.

At an end portion of the inner cylinder 91 on the processing object O side, there is formed a tapered portion 91*b* which is tapered so as to have a smaller diameter toward the processing object O side.

The tapered portion 91*b* has a function of narrowing down the flow of the purge gas PG and increasing the flow speed while allowing the passage of the laser beam L.

The outer cylinder 92 is a cylindrical member disposed concentrically with the inner cylinder 91 and is provided on an outer diameter side of the inner cylinder 91.

Between the inner peripheral surface of the outer cylinder 92 and the outer peripheral surface of the outer cylinder 91, a continuous gap is formed over the entire circumference.

At the end of the housing 80 side of the outer tube 92, a small diameter portion 92*a* is formed in a stepped shape and to have a small diameter with respect to the other portions.

The small diameter portion 92*a* is fixed in a state of being fitted into an end portion of the housing 80 on the processing object O side.

An edge of an end 92*b* of the outer cylinder 92 on the processing object O side is formed to be inclined with respect to a rotation center axis of rotation of the rotary cylinder 40, so that an upper side becomes a housing 80 side relative to the lower side at the time of normal use of irradiation with the rotation center axis of the rotary cylinder 40 being horizontal.

The dust collecting device connecting cylinder 93 is a cylindrical tube body which protrudes from the outer cylinder 92 toward the outer diameter side, and is connected to the inner diameter side of the outer cylinder 92 in the vicinity of the end on the processing object O side of the outer cylinder 92 and in a state of communicating with the inner diameter side of the outer cylinder 92.

The dust collector connecting tube 93 is provided below the outer cylinder 92 during the aforementioned normal use.

The dust collector connecting tube 93 is disposed to be inclined with respect to the outer cylinder 92 so as to approach the housing 80 side from the processing object O side and depart (separate) from the outer cylinder 92

The end of another side of the dust collector connection tube 93 is connected to the dust collector (not shown), and vacuum suction is carried out so that an inside may serve as negative pressure.

In an embodiment, by rotating the rotary cylinder 40 and the wedge prism 20 while emitting the laser beam L, the beam spot BS turns (rotates) on a circular arc of a predetermined radius along the surface of the processing object O.

In this state, by relatively moving the irradiation head 1 parallel along the surface of the processing object O, it is possible to perform a process in which the beam spot BS scans the surface of the processing object O in a state in which the scanning pattern (circular rotation in the first embodiment) moves on the surface at a predetermined feed speed.

As the beam spot BS passes, the surface of the processing object O is provided with a spike-like thermal history which is instantaneously heated and then cooled, and a part of the surface layer is crushed or melted together with the deteriorated material such as white rust and is scattered around and removed.

FIG. 2 is a diagram illustrating an example of a trajectory tracks (passage, path) of a beam spot BS in an embodiment.

As shown in FIG. 2, the beam spot BS rotates in response to the rotation of the wedge prism 20 and moves in the feed direction of the irradiation head 1 relative to the processing object O.

As a result, when the wedge prism 20 rotates one round (360°), an offset is generated between the previously illuminated path P0 (beam spot trajectory) and the current path P1.

Therefore, in the present specification, the claims, etc., the ratio (w/d×100(%)) of the beam spot BS of the width w where the immediately-irradiated path P0 and the latest path P1 overlap is defined as the overlap rate that is a ratio of the width to the diameter d of the beam spot BS, where the width w is an overlap of the path P0 irradiated immediately before and the latest path P1.

The overlap rate is a value indicating a ratio in which the passage path of the beam spot BS overlaps the passage path of the beam spot BS in the immediately preceding irradiation, when the beam spot BS repeatedly passes a predetermined portion in the scanning pattern.

Here, in a case where the scanning pattern is circular as in the present embodiment, the width W can also be defined as the scanning amount (the feeding amount of the irradiation head) during a period during which the wedge prism 20 rotates 360° (during one cycle).

That is, the overlap ratio can be defined as the ratio of the diameter of the beam spot to the feed speed of the scanning pattern in one cycle of the scanning pattern, and for example, in the left and right regions of the circular turning tracks in FIG. 2, the overlap ratio according to this definition substantially coincides with the overlap ratio according to the above-described definition.

A comparative example and Example 1 and Example 2 of the surface processing method of the present embodiment will now be described.

In Examples 1 and 2, and in the comparative example, a member of the steel tower in which a deteriorated portion, such as the occurrence of white rust, has occurred due to salt damage or the like caused by the scattering of seawater, was used as the processing object O.

The processing object O is a steel member on which a protective layer is formed by hot clip galvanizing.

It should be noted that in such a structure, the steel material of the base material may already be partially exposed depending on the thickness of the protective layer at the time of new construction, or subsequent use conditions, etc. However, in the following description, a portion having a film thickness of 400 μm or more, for example, is used as a test material. At such portion it is considered to be effective to leave an existing hot-clip galvanizing layer.

The protective layer composed of mainly by zinc is bonded via an alloy layer formed between zinc and steel.

COMPARATIVE EXAMPLE

In the comparative example, a cup wire, which is a power tool, subjected to a so-called scraping treatment that scrapes the protective layer of white rust and hot dip galvanizing by mechanical input.

In the comparative example, the film thickness of the protective layer prior to scraping is 412 μm, whereas the film thickness after scraping is 245 μm and the film thickness is reduced by 167 μm.

The surface roughness after scraping (the depth of the bottom of the recess from the point of the protrusion) was 20.9 μm, and the result of visual evaluation, residual of white rust is confirmed.

Incidentally, in the case of scraping by a power tool, there are many variations in the removal amount of the removal object according to the contact state of the tool to the processing object O, and when the protection layer is locally completely removed and the steel material is exposed, a rust prevention treatment by, for example, a zinc-rich paint is separately required. However, in this case, since the protective layer formed by zinc with an organic binder differs from that formed by hot clip galvanizing, and the protective layer is not bonded via the alloy layer, corrosion prevention and rust prevention performance are inferior to the protective layer by hot dip galvanizing.

Besides, the salt content on the surface of the processing object O before scraping was 883.9 mg/m2, and the salt content after scraping was 146.3 mg/m2.

Incidentally, the salt content can be measured using a known surface salinity meter according to, for example, JIS Z 0313.

Further, in the comparative example, a reduction in salinity can be confirmed when washed with water. However, the salt content after water washing is 51.4 mg/m2. Considering the corrosion resistance when a structure such as a steel tower is continuously used, for example, about 10 to 20 years, salt content is required to be reduced more.

Example 1

In Example 1, in the following irradiation conditions, two passes of the laser beam L (two passes of the turning circle) were applied.

The irradiation condition of the laser beam L is set so that a layer on the side opposite to the steel material side of the protective layer can be removed together with the deteriorated part such as white rust, and a layer on the steel side of the protective layer (and the alloy layer when the alloy layer is formed between the protective layer and the steel material) remains in a state of covering the surface of the steel material on which the protective layer is formed (and the alloy layer when the alloy layer is formed).

For example, the irradiation conditions of the laser beam L are set such that the protective layer and the alloy layer are not removed at least over a wide range (typically substantially the entire surface) of the processing object O and the steel material is not exposed. The alloy layer, as well as the protective layer, also serves as a layer to protect the steel material, which is the base material.

The laser beam L was irradiated such that the overlap rate described above was 20%.

In Example 1, the film thickness of the protective layer prior to irradiation is 456 μm, whereas the film thickness after 2-pass irradiation is 197 μm and the film thickness is reduced by 259 μm.

The surface roughness after scraping was 66.9 μm, and the result of visual assessment is that white rust was completely removed and the glossy shining zinc was exposed over the entire surface. Also, the exposure of the steel material as the base material could not be confirmed.

On the surface after irradiation, an arc-shaped irradiation mark along the turning circle of the beam spot BS was confirmed. Such irradiation marks can be confirmed by peeling the coating film with a solvent, a chemical release agent, or the like, for example, even when re-painting coating is applied after processing.

The surface roughness is rougher than comparative examples, this is mainly because of the irradiation mark. It is believed that this would be advantageous regarding in terms of adhesion of the coating when re-painting is applied to the surface after processing.

The salt content before irradiation on the surface of the processing object O was 883.9 mg/m2, and the salt content after 2-pass irradiation was 12.3 mg/m2. In Example 1, the degree of rust removal and the amount of residual salt are significantly improved compared to the comparative examples.

Example 2

In Example 2, only one path of the laser beam L was applied under the same irradiation conditions as in Example 1, and washing with tap water was applied after irradiation.

Washing is done, for example, by spraying tap water onto the treatment object O using a high-pressure washer.

In Example 2, the film thickness of the protective layer before irradiation is 496 μm, whereas the film thickness after one pass irradiation is 253 μm and the film thickness is reduced by 243 μm.

The surface roughness after chaplet scraping was 40.4 μm, and the visual assessment results in complete removal of white rust and exposure of glossy zinc over the entire surface. Also, the exposure of the steel material as the base material could not be confirmed.

On the surface after irradiation, similar as in Example 1, an arc-shaped irradiation mark along the turning circle of the beam spot BS was confirmed.

The salt content before irradiation on the surface of the processing object O was 883.9 mg/m2, and the salt content after irradiation was 61.2 mg/m2.

Further after washing with water, the salt content was 11.4 mg/m2.

In Example 2, the degree of rust removal and the amount of residual salt are further improved from Example 1. Also, the amount of removal of the protective layer can be reduced, and the reduction of the residual film thickness can be suppressed.

In addition, by using the irradiation step as one pass, time and energy such as electric power required for processing can be reduced. Water washing can further reduce the salt content than in the two-pass Example 1.

FIG. 3 is a schematic cross-section of a surface of a processing object in time series before and after a surface processing method (comparative example, etc.) by a power tool according to the prior art.

FIGS. 3(a) to 3(f) sequentially show a schematic cross-section of the object at the same location in time series (same as in FIG. 4 described below).

As shown in FIG. 3(a), in a state where the processing object is new, a protective layer 120 containing zinc as a main component is formed on the surface of the steel material 110 as a base material.

The protective layer 120 is formed, for example, by hot dip galvanizing dipping the steel material 110 into molten liquid zinc at about 440 to 460° C.

The protective layer 120 is an η layer having a composition similar to a molten zinc bath.

Between the steel material 110 and the protective layer 120, an alloy layer 130 is formed which was formed during a hot dip galvanizing process.

The alloy layer 130 is an iron and zinc alloy layer which includes, for example, a ζ layer having an iron content of about 6%, a δ1 layer having an iron content of about 7 to about 11%, and the like, wherein the iron concentration varies with a concentration gradient.

The alloy layer 130 is formed by heating the surface of the steel material 110 when performing a hot dip galvanizing process so that the thermal vibration of the atoms is strong, the iron atoms diffuse from the surface of the steel material 110 to the zinc layer, and the zinc atoms diffuse into the interior of the steel material 110.

When the processing object is a structure installed outdoors, such as a steel tower for a communication facility, with use of the structure, as shown in FIG. 3(b), deposits 140 such as salt-containing seawater adhere to the surface of the protective layer 120.

Thereafter, as shown in FIG. 3(c), a white rust 150 is formed on the surface of the protective layer 120, by such as corrosion of a portion of the protective layer 120 by the deposit 140.

The white rust 150 is composed mainly of a zinc oxide produced by oxidation of zinc in the protective layer 120. Also, the white rust 150 contains salt derived from the deposit 140

The white rust 150 tends to occur when exposed to an environment where the surface of the protective layer 120 is wet with moisture and is not easily dried, particularly to a remarkable degree when salt is deposited.

When the white rust 150 is left as it is, film thickness reduction due to corrosion of the protective layer 120 proceeds, and there is a concern that the corrosion protection effect to the steel material 110 by the protective layer 120 is impaired.

In a surface processing using a power tool such as a cup wire, for example, as shown in FIG. 3(d), the white rust 150 cannot be completely removed, and a portion of the white rust 150 remains on the surface of the protective layer 120 (corresponding to the comparative example described above).

Incidentally, when the surface is excessively polished in order to prevent such residue, as shown in FIG. 3(e), substantially all of the protective layer 120 has been stripped to expose the iron-containing alloy layer 130.

In such a case, as shown in FIG. 3(f), when the under-coat layer 160 and the upper-coat layer 170 are formed by a new painting, the adhesion of the undercoat layer 160 is impaired by corrosion, and the undercoat layer 160 may peel off from the substrate.

In this case, it is difficult to sufficiently ensure the corrosion resistance of the steel material 110.

FIG. 4 is a schematic cross-sectional view in a time series of a surface of a processing object before and after the surface processing method of the embodiment.

FIGS. 4(a) to 4(c) are similar to FIGS. 3(a) to 3(c) described above.

In the state of irradiation with the laser beam L shown in FIG. 4(d), substantially all of the white rust 150 and a portion of the protective layer 120 on the opposite side from the steel material 110 are melted, crushed and removed by heat input or the like at the time of irradiation with the laser beam L.

On the other hand, some portion of layers in the protective layer 120 on the steel material 110 side and the alloy layer 130 side remain bonded to them.

On the surface of the remaining protective layer 120, concave-convex irregularities are formed by irradiation marks T formed by scanning the beam spot BS.

Also, because the alloy layer 130 is maintained through the stages before and after the surface processing, the bond strength between the steel material 110 and the protective layer 120 is kept substantially equal before and after the surface processing.

However, at this point, salt may sometimes remain and adhere to the surface of the protective layer 120.

Thus, in the embodiment (Example 2), the surface of the protective layer 120 is washed with water to reduce salt content.

FIG. 4(e) shows a state after water washing.

FIG. 4(f) shows a state after sequentially applying the under-coat layer 160 and the upper-coat layer 170 after water washing.

In the embodiment shown in FIG. 4, prior to painting of the under-coat layer 160, substantially all of the white rust 150 and salt are removed in at least a portion of the surface of the protective layer 120, thereby preventing separation of the under-coat layer 160 from the protective layer 120 arising from corrosion and improving the adhesion and peeling resistance of the under-coat layer 160.

In addition, since the unevenness caused by the irradiation mark T exerts an effect of increasing the adhesion strength of the under-coat layer 160 to the protective layer 120 due to the anchor effect, the peeling of the undercoat layer 160 is more reliably prevented.

FIG. 5 is a photograph of the appearance after surface processing in Example 1 and Example 2 of the present invention, and a Comparative Example.

A comparative example, Example 1, and Example 2 are shown in this order from the upper stage.

In the comparative example shown in FIG. 5(a), it can be seen that the white rust left in the scraping process by the cup wire remains. Such a situation is undesirable, however, when providing a greater mechanical force to perform the scraping treatment, a region is formed where the protective layer 120 is completely removed with the alloy layer 130, and there is a concern that the corrosion protection effect is significantly impaired.

As in the examples 1 and 2 shown in FIGS. 5(b) and 5(c), when processing by the laser beam L is performed, it can be confirmed that an arc-shaped irradiation mark is formed along the path through which the beam spot BS passes.

In FIGS. 5(b) and 5(c), the residual white rust 150 cannot be confirmed and it can be confirmed that the metallic surface of zinc is substantially exposed over the entire surface.

When the surface processing method of the present embodiment is performed, if the protective layer 120 of even 1 μm average thickness remains on the surface of the irradiation object O after the treatment, some level of corrosion protection effect can be obtained by the sacrificial corrosion protection effect. But, it is preferable to have an average film thickness of 28 μm or more, for example, according to the standard of one type A of JIS H8641 related to hot clip galvanizing.

More preferably, it may be configured to have an average film thickness of 69 μm or more, according to the standard of two type 50 JIS H 8641 required for steel products having a thickness of greater than 5 mm.

Further, if the structure is used in a harsh corrosive environment (such as along the sea), it may have an average film thickness of 76 μm or more, according to the standard of two type 55 of JIS H8641.

Preferably, the salt content is 50 mg/m2 or less by a measurement method according to JIS Z 0313.

This value is common, for example, as the amount of residual attached salt content allowed in the scraping treatment prior to painting of the steel that is affected by salt damage corrosion.

By setting the salt content to 50 mg/m2 or less, it is believed that corrosion resistance without practical problems can be ensured during the use of the structure.

It should be noted that, in the object O to be processed, the steel material 110 may be exposed when the protective layer 120 is lost by corrosion, wear, etc. in some areas before irradiation of the laser beam L, and the steel material 110 may be exposed when the white rust 150 is removed. However, even in such a case, the effect of enhancing the corrosion resistance of the steel material 110 in such other areas can be obtained if there are other areas remaining before and after the irradiation by the protective layer 120.

However, if the processing object O is, for example, a structural member such as a steel tower, if the protective layer 120 is not left before irradiation with the laser beam L, there is a risk of cross-sectional defect, and therefore member replacement may be required.

In addition, in a region where the protective layer 120 was present before irradiation of the laser beam L, it is preferable that the layer on the steel material 110 side of the protective layer 120 remains substantially over the entire area after the laser beam L is irradiated. But even if the protective layer 120 is removed by the laser beam L and the portion where the steel material 110 is exposed is partially present, the effect of increasing the corrosion resistance of the steel material 110 can be obtained in areas other than places where the steel material 110 is exposed.

In the surface processing method according to the prior art, for example, in the case of mechanically removing a deteriorated coating film or the like by a disc sander or the like, as in the technique described in the above-mentioned patent document 1, it is presupposed that a steel material or the like, which is a base material, is exposed because the aggressiveness to the existing protective layer is strong.

The technique described in Patent Document 2 is not intended for hot clip galvanizing, but is a technique that assumes that deposits on the surface of the object to be treated are removed and the base material is exposed.

In contrast, according to the present embodiment, the following effect can be obtained.

(1) So that the protective layer 120 remains on the steel material 110 side, a layer of the protective layer 120 on the opposite side of the steel material 110 is removed by irradiation of the laser beam L. By leaving a part of the protective layer 120 on the steel material 110 side in a joined state via the alloy layer 130 similar to that before the processing, the corrosion resistance of the steel material 110 by the protective layer 120 can be ensured even after the white rust 150 has been removed.

Comparing to a mechanical surface scraping where it is assumed that tools such as a cup wire are directly accessible, the irradiation of the laser beam L can be performed relatively remotely by setting the focal length of the focus lens 10. In a narrow portion, for example, such as a periphery of a recess or a bolt nut, can be easily and reliably performed.

Further, since the irradiation mark T is formed on the surface of the object O to be processed by irradiation of the laser beam L and the surface roughness becomes rough, the bond strength of the painting coating film in the case of re-painting the surface after processing can be secured.

In the technique described in Patent Document 1 and Document 2, when a protective layer containing zinc is newly formed by an organic binder using, for example, a zinc-rich paint after the protective layer has been removed, there is a concern about a decrease in the bond strength between the protective layer and the base material when compared with the new construction of the structure, however, in this embodiment, there is no need to consider such a concern about the area where the protective layer 120 remains.

(2) By configuring the beam spot BS to scan the surface of the processing object O while turning in an arc shape, when focusing attention on one point of the surface of the processing object, the irradiation time and the irradiation period can be appropriately controlled by the irradiation circle diameter and the rotation speed of the wedge prism 20, and the processing quality can be secured.

By performing such a turning scan, the processing area per unit time can be enlarged and the processing can be accelerated.

(3) By forming the protective layer 120 by hot-clip galvanizing, the white rust 150 can be removed while maintaining the sacrificial anticorrosive effect between the zinc-made protective layer 120 and the ferrous metal of the steel material 110, and the above-described effect can be obtained.

(4) After irradiation with the laser beam L, the surface of the processing object O is washed with tap water, so that the salt remaining on the surface can be reduced even when the heat input by the laser irradiation is relatively small.

Therefore, good processing construction quality with a small amount of residual salt can be obtained while suppressing energy such as electrical power required for laser irradiation and processing time.

(5) The amount of residual salt on the surface after surface processing is 50 mg/m2 or less, thereby ensuring durability such as corrosion resistance after processing.

Variations of the Invention

The present invention is not limited to the embodiments described above, and various modifications and changes may be made, and they are within the technical scope of the present invention.

(1) Constitution of surface processing methods and structures are not limited to the embodiments described above, and may be modified suitably.

For example, the irradiation condition of the laser beam in the embodiment is an example, and can be appropriately changed according to the state of the processing object.

(2) In the embodiment, the processing object is a steel material in which a protective layer is formed by hot-dip galvanizing as an example, but the material and manufacturing method of the processing object can be changed, as appropriate, without limitation.

For example, a zinc-based protective layer may be formed by a process other than hot-dip plating such as thermal spraying. In addition, a protective layer containing, for example, an aluminum-based other than zinc may be formed.

(3) In embodiments, a rotating wedge prism may be utilized to pivot the irradiation spot (beam spot) into a circular shape at the surface of the processing object, but the irradiation spot may be periodically moved (typically pivoted) along other patterns.

For example, a galvanometer mirror or a polygon mirror may be used as a means for deflecting a laser beam to form such a pattern. In addition, a plurality of optical elements such as a wedge prism, a galvanometer mirror, and a polygon mirror may be used in combination.

(4) In the embodiment (Example 2), water washing is applied after laser irradiation, but is not limited to water, but may be washed with another liquid containing water as a main component.

For example, a salt damage corrosion inhibitor composed of a surfactant or the like or an aqueous solution of other substances may be used to perform washing.

CODE DESCRIPTION

| | |
|---|---|
| 1 | irradiation head |
| 10 | focus lens |
| 20 | wedge prism |
| 30 | protective glass |
| 40 | rotary cylinder |
| 50 | motor |
| 60 | motor holder |
| 61 | purge gas flow path |
| 70 | protective glass holder |
| 80 | housing |
| 90 | duct |
| 91 | inner cylinder |
| 91a | small diameter portion |
| 91b | tapered portion |
| 92 | outer cylinder |
| 92a | small diameter portion |
| 92b | end part |
| 93 | dust collecting device connecting tube |
| BS | beam spot |
| P | beam spot path |
| A | space |
| L | laser beam spot |
| PG | purge gas |
| O | processing object |
| 110 | steel material |
| 120 | protective layer |
| 130 | alloy layer |
| 140 | deposit |
| 150 | white rust |
| 160 | under-coat layer |
| 170 | top-coat layer |
| T | Irradiation Mark |

The invention claimed is:

1. A surface processing method of an iron based metallic material having a protective layer of zinc galvanizing formed thereon, comprising:
irradiating a surface of the protective layer with laser beam and scanning the surface, while moving an irradiation spot along the surface,
wherein, in a state in which a side layer of the protective layer along the iron based metallic material remains, another side layer of the protective layer opposite to the iron based metallic material side, including a deteriorated portion, is removed by the irradiating of the surface of the protective layer with the laser beam.

2. The surface processing method of claim 1, wherein:
- a layer of iron-zinc alloy is formed between the iron based metallic material and the protective layer; and
- a part of the protective layer remains in a joined state via the layer of iron-zinc alloy with the iron based metallic material, after completion of the irradiating of the surface of the protective layer with the laser beam.

3. The surface processing method of claim 1, further comprising:
- setting an energy density and/or an irradiation time given to the surface of the protective layer by the irradiation of the laser beam depending on an amount of the deteriorated portion and/or a film thickness of the protective layer.

4. The surface processing method according to claim 1, wherein
- after the surface is irradiated with the laser beam, the surface is cleaned with a liquid containing water as a main component.

5. The surface processing method according to claim 1, wherein
- the amount of salt content attached to the surface after the irradiation is 50 mg/m$^2$ or less.

6. The surface processing method of claim 1, wherein scanning is performed in a state in which the irradiation spot periodically moves along a predetermined pattern on the surface.

7. The surface processing method according to claim 4, wherein the amount of salt content attached to the surface after the cleaning is 50 mg/m$^2$ or less.

* * * * *